(12) United States Patent
Kato

(10) Patent No.: US 9,490,515 B2
(45) Date of Patent: Nov. 8, 2016

(54) HIGH-FREQUENCY SIGNAL LINE

(71) Applicant: Murata Manufacturing Co., Ltd., Nagaokakyo-shi, Kyoto-fu (JP)

(72) Inventor: Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 241 days.

(21) Appl. No.: 14/547,374

(22) Filed: Nov. 19, 2014

(65) Prior Publication Data

US 2015/0072725 A1  Mar. 12, 2015

Related U.S. Application Data

(63) Continuation of application No. PCT/JP2013/074650, filed on Sep. 12, 2013.

(30) Foreign Application Priority Data

Oct. 12, 2012  (JP) ................. 2012-226567

(51) Int. Cl.
    *H01P 3/08*   (2006.01)
    *H04M 1/725*  (2006.01)
    *H01P 3/06*   (2006.01)

(52) U.S. Cl.
    CPC ............. *H01P 3/082* (2013.01); *H01P 3/085* (2013.01); *H04M 1/725* (2013.01); *H01P 3/06* (2013.01)

(58) Field of Classification Search
    CPC .......... H01P 3/08; H01P 3/081; H01P 3/085; H01P 3/082
    USPC ....................................... 333/238
    See application file for complete search history.

(56) References Cited

U.S. PATENT DOCUMENTS

| | | | |
|---|---|---|---|
| 2009/0027144 A1* | 1/2009 | Saito | H01P 3/003 333/238 |
| 2010/0201459 A1* | 8/2010 | Kawaguchi | H01P 3/08 333/204 |
| 2012/0097433 A1 | 4/2012 | Kato et al. | |
| 2012/0274423 A1 | 11/2012 | Kato | |

FOREIGN PATENT DOCUMENTS

| | | |
|---|---|---|
| JP | 11-289204 A | 10/1999 |
| JP | 2009-016521 A | 1/2009 |
| WO | 2011/007660 A1 | 1/2011 |
| WO | 2012/074100 A1 | 6/2012 |

OTHER PUBLICATIONS

Official Communication issued in International Patent Application No. PCT/JP2013/074650, mailed on Dec. 10, 2013.

\* cited by examiner

*Primary Examiner* — Stephen E Jones
(74) *Attorney, Agent, or Firm* — Keating & Bennett, LLP

(57) ABSTRACT

A high-frequency signal line includes a dielectric laminate body including a first dielectric layer, an adhesive layer and a second dielectric layer laminated in this order from a first side to a second side in a direction of lamination. A linear signal line is fixed on a main surface of the adhesive layer. A main ground conductor is provided on a main surface of the dielectric layer. An auxiliary ground conductor is provided on the second dielectric layer. The adhesive layer bonds the first and second dielectric layers together. A distance in the direction of lamination between the signal line and the main ground conductor is greater than a distance in the direction of lamination between the signal line and the auxiliary ground conductor.

20 Claims, 8 Drawing Sheets

F I G . 3
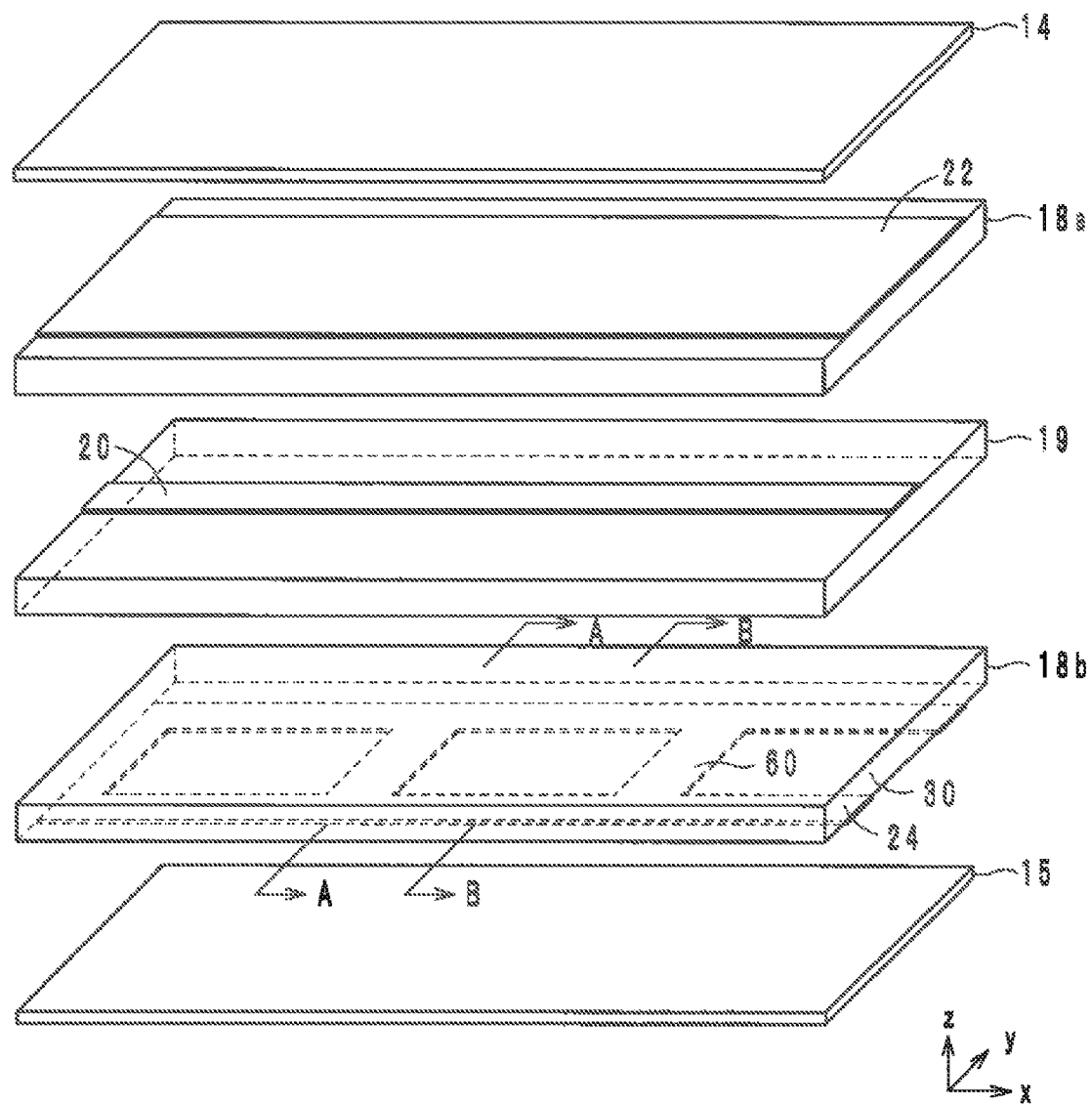

F I G . 4
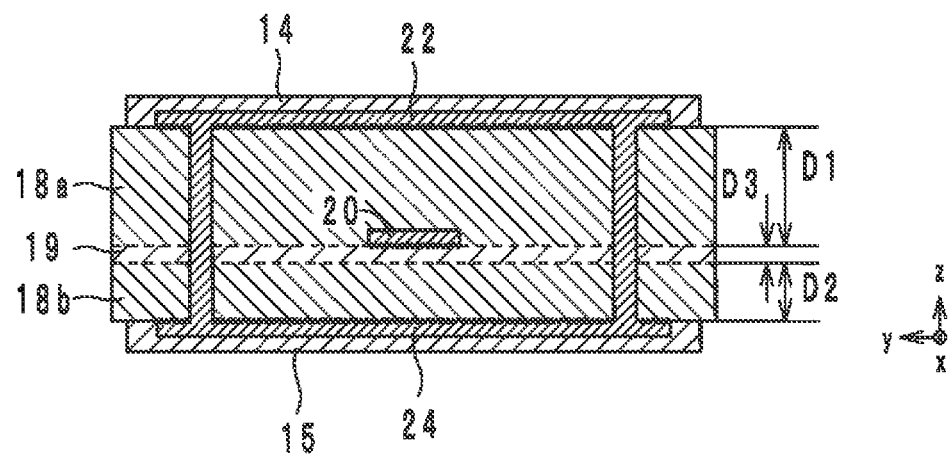
F I G . 5
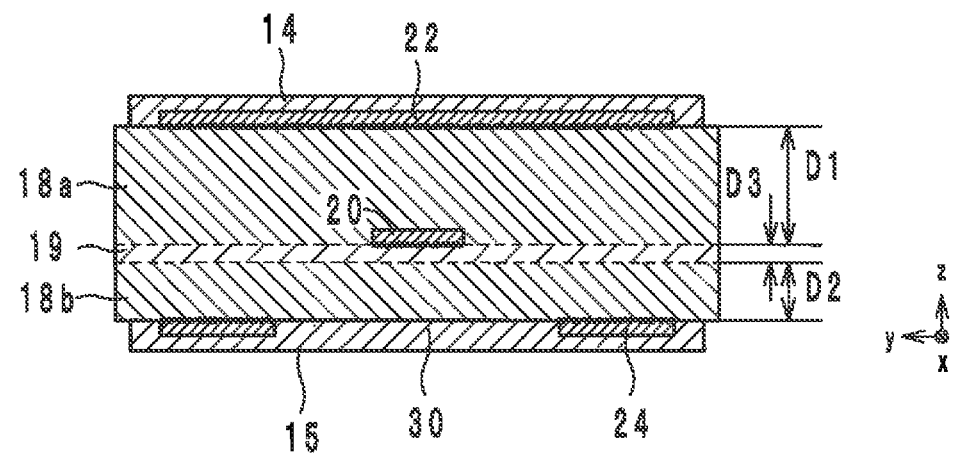

HIGH-FREQUENCY SIGNAL LINE

BACKGROUND OF THE INVENTION

1. Field of the Invention

The present invention relates to a high-frequency signal line, and more particularly to a high-frequency signal line preferably for use in high-frequency signal transmission.

2. Description of the Related Art

As a conventional high-frequency signal line, for example, a signal line disclosed in WO 2011/007660 is known. The signal line includes a laminate body, a signal line and two ground conductors. The laminate body is formed by laminating insulating sheets. The signal line is embedded in the laminate body. The two ground conductors are arranged in the laminate body so as to sandwich the signal line from both sides in the direction of lamination. Accordingly, the signal line and the two ground conductors form a triplate stripline structure.

Each of the ground conductors has openings in portions over the signal line when viewed from the direction of lamination. In the portions where the openings are located, less capacitance is created between the signal line and each of the ground conductors. Thereby, it is possible to shorten the distance in the lamination of direction between the signal line and each of the ground conductors without causing too large a reduction in the characteristic impedance of the signal line. Accordingly, it is possible to make the high-frequency signal line thinner. Such a high-frequency signal line is used, for example, to connect two circuit boards.

The high-frequency signal line disclosed by WO 2011/007660, however, has a problem that the interval between the signal line and each of the ground conductors varies depending on the conditions at the time of pressure-bonding the laminate body. Specifically, in the pressure-bonding process of the high-frequency signal line, heat and pressure are applied to the laminate of insulating sheets. By this process, the insulating sheets, which are formed of liquid polymer, polyimide or the like, are softened, and adjacent insulating sheets in the direction of lamination are joined together.

However, if the heating condition and the pressing condition of the pressure-bonding process vary, the softening degree of the insulating sheets will vary. Consequently, among laminate bodies produced by the pressure-bonding process, the thicknesses of the insulating sheets vary, and the interval between the signal line and each of the ground conductors vary.

SUMMARY OF THE INVENTION

Preferred embodiments of the present invention provide a high-frequency signal line wherein an interval between a signal line and a ground conductor is prevented from varying.

A high-frequency signal line according to a preferred embodiment of the present invention includes a dielectric laminate body including a first dielectric layer, an adhesive layer and a second dielectric layer laminated in this order from a first side to a second side in a direction of lamination, the first dielectric layer including a first main surface and a second main surface, the first main surface being closer to the first side than the second main surface and the second main surface being closer to the second side than the first main surface, the adhesive layer including a third main surface and a fourth main surface, the third main surface being closer to the first side than the fourth main surface and the fourth main surface being closer to the second side than the third main surface; a linear signal line fixed on the third main surface of the adhesive layer; a main ground conductor provided on the first main surface of the first dielectric layer; and an auxiliary ground conductor provided on the second dielectric layer. The adhesive layer bonds the first dielectric layer and the second dielectric layer together, and a distance in the direction of lamination between the signal line and the main ground conductor is greater than a distance in the direction of lamination between the signal line and the auxiliary ground conductor.

According to various preferred embodiments of the present invention, variations in the interval between a signal line and a main ground conductor are reliably prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is an exploded view of a line portion of the high-frequency signal line.

FIG. 4 is a sectional view cut along the line A-A indicated in FIG. 3.

FIG. 5 is a sectional view cut along the line B-B indicated in FIG. 3.

DETAILED DESCRIPTION OF THE PREFERRED EMBODIMENTS

High-frequency signal lines according to preferred embodiments of the present invention will be hereinafter described with reference to the drawings.

Figure 1:
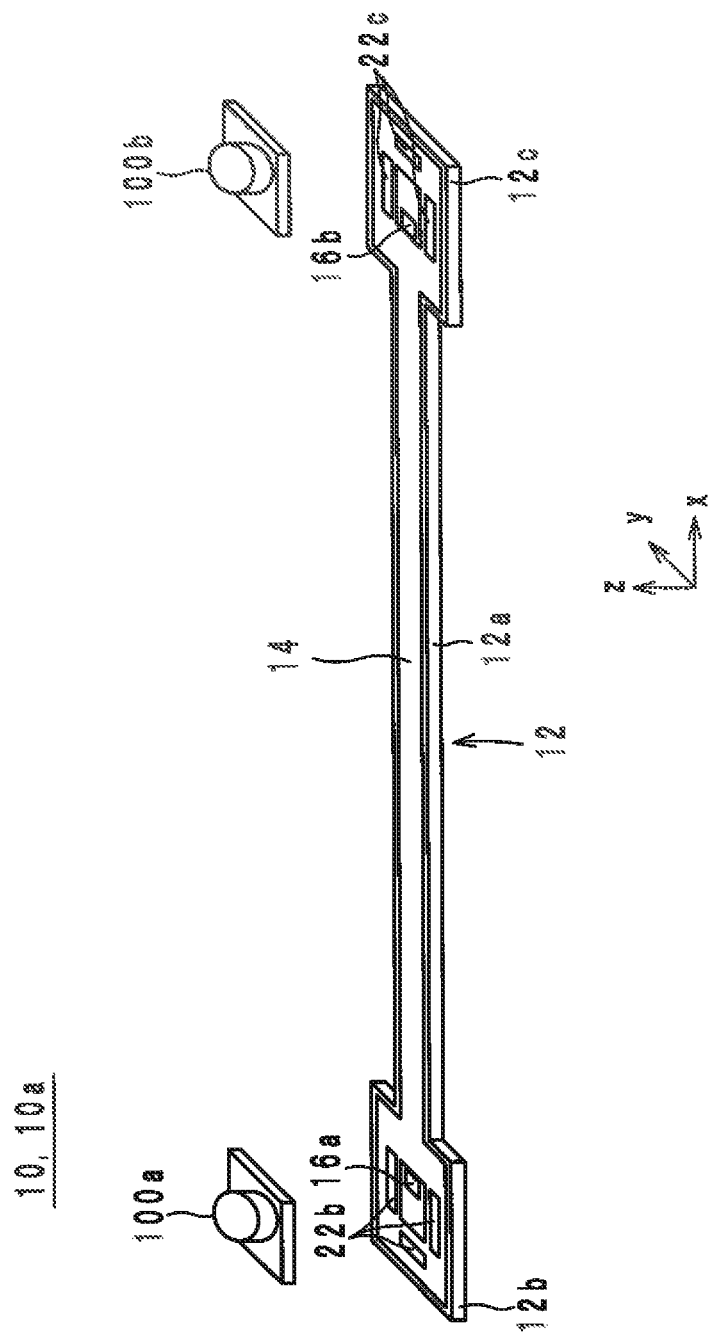
FIG. 1 is a perspective view of a high-frequency signal line according to a preferred embodiment of the present invention.
Figure 2:
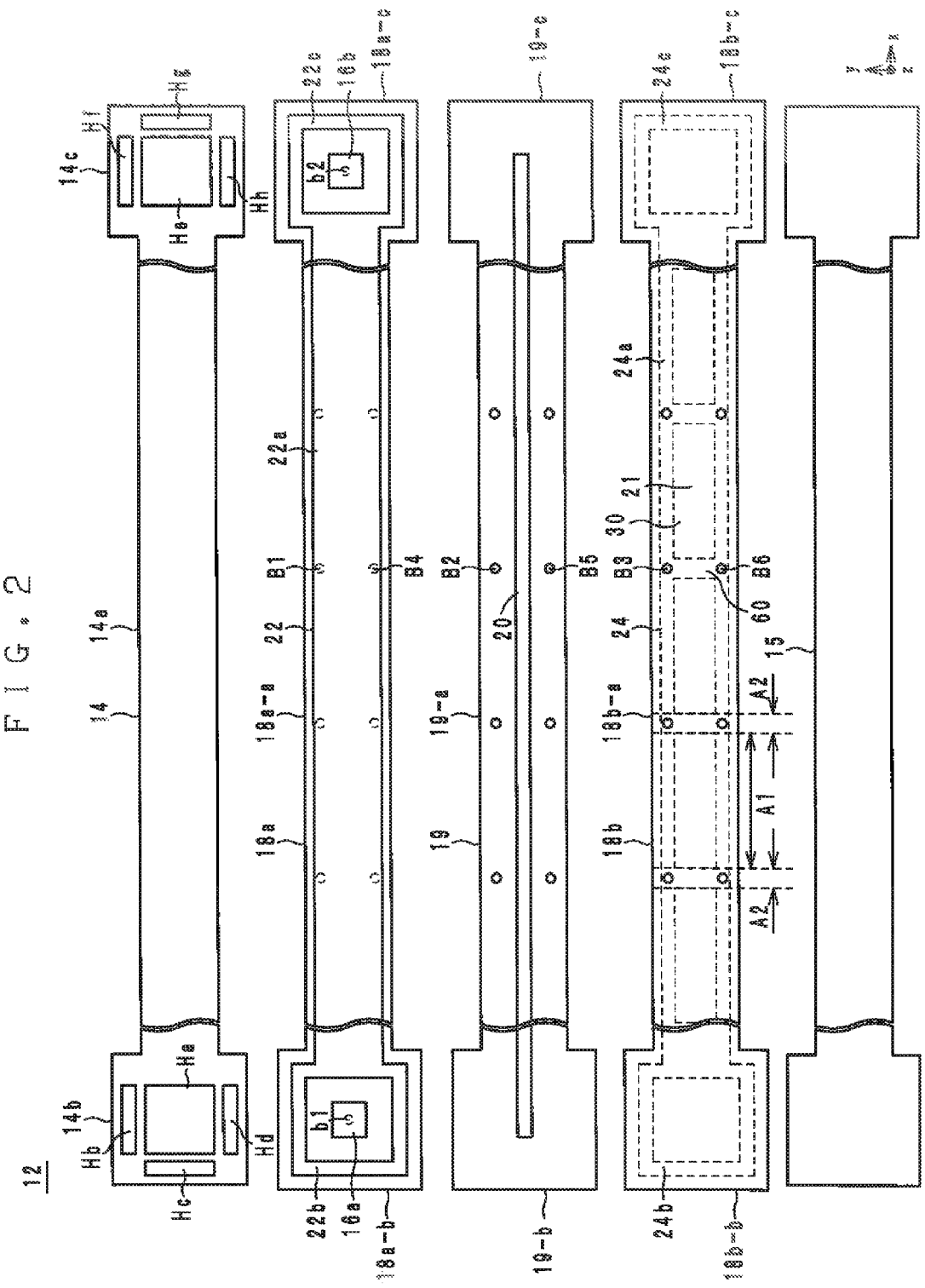
FIG. 2 is an exploded view of a laminate body of the high-frequency signal line of FIG. 1.

The structure of the high-frequency signal line according to various preferred embodiments of the present invention is described with reference to the drawings. FIG. 1 is a perspective view of a high-frequency signal line 10 according to a preferred embodiment of the present invention. FIG. 2 is an exploded view of a laminate body 12 of the high-frequency signal line 10. FIG. 3 is an exploded view of a line portion 12a of the high-frequency signal line 10. FIG. 4 is a sectional view cut along the line A-A indicated in FIG. 3. FIG. 5 is a sectional view cut along the line B-B indicated in FIG. 3. In the following, the direction of lamination of the high-frequency signal line 10 is defined as a z-direction. The lengthwise direction of the high-frequency signal line 10 is defined as an x-direction, and the direction orthogonal to the x-direction and the z-direction is defined as a y-direction.

The high-frequency signal line 10 is, for example, a flat cable preferably for use in an electronic device such as a cell phone or the like to connect two high-frequency circuits. As illustrated in FIGS. 1 through 3, the high-frequency signal line 10 includes a dielectric laminate body 12, external electrodes 16a and 16b, a signal line 20, a main ground conductor 22, an auxiliary ground conductor 24, via-hole conductors b1, b2 and B1 through B6, and connectors 100a and 100b.

The dielectric laminate body 12 preferably is, as seen in FIG. 1, a flexible plate-shaped member extending in the x-direction when viewed from the z-direction. The dielectric laminate body 12 includes a line portion 12a, and connecting portions 12b and 12c. As illustrated in FIG. 2, the dielectric laminate body 12 is a laminate including a protective layer 14, a dielectric sheet 18a, an adhesive layer 19, a dielectric sheet 18b and a protective layer 15 arranged in this order from a positive side to a negative side in the z-direction. In the following, a main surface of the dielectric laminate body 12 on a positive side in the z-direction is hereinafter referred to as a top surface, and a main surface of the dielectric laminate body 12 on a negative side in the z-direction is hereinafter referred to as a bottom surface.

The line portion 12a, as seen in FIG. 1, extends in the x-direction. The connecting portions 12b is connected to a negative end in the x-direction of the line portion 12a, and the connecting portion 12c is connected to a positive end in the x-direction of the line portion 12a. The connecting portions 12b and 12c preferably are rectangular or substantially rectangular. The widths (sizes in the y-direction) of the connecting portions 12b and 12c are greater than the width (size in the y-direction) of the line portion 12a.

The dielectric sheets 18a and 18b, as seen in FIG. 2, extend in the x-direction and have the same shape as the dielectric laminate body 12 when viewed from the z-direction. The dielectric sheets 18a and 18b are sheets formed of flexible thermoplastic resin such as polyimide, liquid polymer or the like. A main surface of each of the dielectric sheets 18a and 18b on the positive side in the z-direction is hereinafter referred to as an upper surface, and a main surface of each of the dielectric sheets 18a and 18b on the negative side in the z-direction is hereinafter referred to as a lower surface.

The adhesive layer 19, as seen in FIG. 2, extends in the x-direction and has the same shape as the dielectric laminate body 12 when viewed from the z-direction. The adhesive layer 19 is a sheet formed of flexible thermoplastic resin such as polyimide, liquid polymer or the like. Thus, the adhesive layer 19 is formed of the same kind of material as the dielectric sheets 18a and 18b. However, the softening point of the adhesive layer 19 is lower than the softening point of the dielectric sheets 18a and 18b. In this preferred embodiment, the softening point of the adhesive layer 19 preferably is, for example, about 250 degrees C., and the softening points of the dielectric sheets 18a and 18b preferably are, for example, about 280 degrees C. The adhesive layer 19 bonds the dielectric sheets 18a and 18b together. A main surface of the adhesive layer 19 on the positive side in the z-direction is hereinafter referred to as an upper surface, and a main surface of the adhesive layer 19 on the negative side in the z-direction is hereinafter referred to as a lower surface.

As seen in FIGS. 4 and 5, the thickness D1 of the dielectric sheet 18a is greater than the total of the thickness D2 of the dielectric sheet 18b and the thickness D3 of the adhesive layer 19. After a process of laminating the dielectric sheet 18a, the adhesive layer 19 and the dielectric sheet 18b, the thickness D1 preferably is, for example, within a range from about 50 μm to about 300 μm. In this preferred embodiment, the thickness D1 preferably is about 150 μm, for example. The total of the thickness D2 and the thickness D3 preferably is, for example, within a range from about 10 μm to about 100 μm. In this preferred embodiment, the total of the thickness D2 and the thickness D3 preferably is about 50 μm, for example. In this preferred embodiment, the thickness D2 preferably is about 20 μm, and the thickness D3 preferably is about 30 μm, for example.

The dielectric sheet 18a, as illustrated in FIG. 2, includes a line portion 18a-a, and connecting portions 18a-b and 18a-c. The adhesive layer 19, as illustrated in FIG. 2, includes a line portion 19-a, and connecting portions 19-b and 19-c. The dielectric sheet 18b includes a line portion 18b-a, and connecting portions 18b-b and 18b-c. The line portions 18a-a, 19-a and 18b-a constitute the line portion 12a. The connecting portions 18a-b, 19-b and 18b-b constitute the connecting portion 12b. The connecting portions 18a-c, 19-c and 18b-c constitute the connecting portion 12c.

The signal line 20 is, as seen in FIGS. 2 and 3, a conductor provided in the dielectric laminate body 12, and the signal line 20 is configured to transmit a high-frequency signal. In this preferred embodiment, the signal line 20 is a linear conductor provided on the upper surface of the adhesive layer 19 and extends in the x-direction. The signal line 20 is fixed on the upper surface of the adhesive layer 19. This includes a case where the signal line 20 is kept in an almost immovable state on the upper surface of the adhesive layer 19 by an anchor effect. The negative end in the x-direction of the signal line 20 is, as seen in FIG. 2, located in the center of the connecting portion 19-b. The positive end in the x-direction of the signal line 20 is, as seen in FIG. 2, located in the center of the connecting portion 19-c. The signal line 20 is formed of a metal material with a low specific resistance including silver or copper. The statement that the signal line 20 is provided on the upper surface of the adhesive layer 19 means that the signal line 20 is formed preferably by plating the upper surface of the adhesive layer 19 with a metal foil and by patterning the metal foil or that the signal line 20 is formed preferably by applying a metal foil on the upper surface of the adhesive layer 19 and by patterning the metal foil. The surface of the signal line 20 is smoothened, and therefore, the surface of the signal line 20 in contact with the adhesive layer 19 has a greater surface roughness than the surface of the signal line 20 out of contact with the adhesive layer 19. The surface roughness means the calculated average roughness Ra provided in JIS B 0601-2001 (compliant with ISO4287-1997), and the same shall apply hereinafter.

The main ground conductor 22 is, as seen in FIGS. 2 and 3, a continuous conductor layer located farther in the positive z-direction than the signal line 20. More specifically, the main ground conductor 22 is provided on the upper surface of the dielectric sheet 18a so as to face the signal line 20 via the dielectric sheet 18a. The main ground conductor 22 does not have openings at positions over the signal line 20. The main ground conductor 22 is formed of a metal material with a low specific resistance including silver or copper. The statement that the main ground conductor 22 is provided on the upper surface of the dielectric sheet 18a means that the main ground conductor 22 is formed preferably by plating the upper surface of the dielectric sheet 18a with a metal foil and by patterning the metal foil or that the main ground conductor 22 is formed preferably by applying a metal foil on the upper surface of the dielectric sheet 18a and by patterning the metal foil. The surface of the main ground conductor 22 is smoothened, and therefore, as illustrated in FIGS. 4 and 5, the surface of the main ground conductor 22 in contact with the dielectric layer 18a has a greater surface roughness than the surface of the main ground conductor 22 out of contact with the dielectric layer 18a.

As seen in FIG. 2, the main ground conductor 22 includes a line portion 22a, and terminal portions 22b and 22c. The line portion 22a is located on the upper surface of the line portion 18a-a and extends in the x-direction. The terminal portion 22b is located on the upper surface of the connecting portion 18a-b and preferably is rectangular or substantially rectangular ring-shaped. The terminal portion 22b is connected to the negative end in the x-direction of the line portion 22a. The terminal portion 22c is located on the upper surface of the connecting portion 18a-c and preferably is rectangular or substantially rectangular ring-shaped. The terminal portion 22c is connected to the positive end in the x-direction of the line portion 22a.

The auxiliary ground conductor 24 is, as seen in FIG. 2, a conductor layer located farther in the negative z-direction than the signal line 20. More specifically, the auxiliary ground conductor 24 is arranged on the lower surface of the dielectric sheet 18b so as to face the signal line 20 via the dielectric sheet 18b and the adhesive layer 19. The auxiliary ground conductor 24 is formed of a metal material with a low specific resistance including silver or copper. The statement that the auxiliary ground conductor 24 is provided on the lower surface of the dielectric sheet 18b means that the auxiliary ground conductor 24 is formed preferably by plating the lower surface of the dielectric sheet 18b with a metal foil and by patterning the metal foil or that the auxiliary ground conductor 24 is formed preferably by applying a metal foil on the lower surface of the dielectric sheet 18b and by patterning the metal foil. The surface of the auxiliary ground conductor 24 is smoothened, and therefore, as illustrated in FIGS. 4 and 5, the surface of the auxiliary ground conductor 24 in contact with the dielectric layer 18b has a greater surface roughness than the surface of the auxiliary ground conductor 24 out of contact with the dielectric layer 18b.

As seen in FIGS. 2 and 3, the auxiliary ground conductor 24 includes a line portion 24a, and terminal portions 24b and 24c. The line portion 18b-a is located on the lower surface of the line portion 18b-a and extends in the x-direction. The terminal portion 24b is located on the lower surface of the connecting portion 18b-b and preferably is rectangular or substantially rectangular ring-shaped. The terminal portion 24b is connected to the negative end in the x-direction of the line portion 24a. The terminal portion 24c is located on the lower surface of the connecting portion 18b-c and preferably is rectangular or substantially rectangular ring-shaped. The terminal portion 24c is connected to the positive end in the x-direction of the line portion 24a.

As seen in FIGS. 2 and 3, the line portion 24a includes rectangular or substantially rectangular openings 30 aligned in the x-direction. Accordingly, the line portion 24a preferably has a ladder shape. In the auxiliary ground conductor 24, intervals between the openings 30 are referred to as bridges 60. Each of the bridges 60 extends in the y-direction. When viewed from the z-direction, the openings 30 and the bridges 60 are alternately arranged to be overlapped with the signal line 20. In this preferred embodiment, the signal line 20 preferably extends in the x-direction while crossing the centers of the openings 30 and the bridges 60.

As described above, the main ground conductor 22 does not have openings, while the auxiliary ground conductor 24 has openings. Therefore, the area of the overlapping portion of the main ground conductor 22 with the signal line 20 is greater than the total area of the overlapping portions of the auxiliary ground conductor 24 with the signal line 20.

As seen in FIG. 2, the external terminal 16a preferably is a rectangular or substantially rectangular conductor provided in the center of the upper surface of the connecting portion 18a-b of the dielectric sheet 18a. Therefore, when viewed from the z-direction, the external terminal 16a is over the negative end in the x-direction of the signal line 20. As seen in FIG. 2, the external terminal 16b preferably is a rectangular or substantially rectangular conductor provided in the center of the upper surface of the connecting portion 18a-c of the dielectric sheet 18a. Therefore, when viewed from the z-direction, the external terminal 16b is over the positive end in the x-direction of the signal line 20. The external terminals 16a and 16b are formed of a metal material with a low specific resistance including silver or copper. The external terminals 16a and 16b are plated with Ni/Au. The statement that the external terminals 16a and 16b are provided on the upper surface of the dielectric sheet 18a means that the external terminals 16a and 16b are formed preferably by plating the upper surface of the dielectric sheet 18a with a metal foil and by patterning the metal foil or that the external terminals 16a and 16b are formed preferably by applying a metal foil on the upper surface of the dielectric sheet 18a and by patterning the metal foil. The surfaces of the external terminals 16a and 16b are smoothened, and therefore, the respective surfaces of the external terminals 16a and 16b in contact with the dielectric layer 18a have a greater surface roughness than the respective surfaces of the external terminals 16a and 16b out of contact with the dielectric layer 18a.

The external terminals 16a and 16b, the signal line 20, the main ground conductor 22 and the auxiliary ground conductor 24 have the same or substantially the same thickness. The thicknesses of the external terminals 16a and 16b, the signal line 20, the main ground conductor 22 and the auxiliary ground conductor 24 preferably are, for example, within a range from about 10 µm to about 20 µm.

As described above, the signal line 20 is sandwiched between the main ground conductor 22 and the auxiliary ground conductor 24 from the both sides in the z-direction. Thus, the signal line 20, the main ground conductor 22 and the auxiliary ground conductor 24 define a triplate stripline structure. As illustrated in FIGS. 4 and 5, the interval (distance in the z-direction) between the signal line 20 and the main ground conductor 22 is equal or substantially equal to the thickness D1 of the dielectric sheet 18a, and preferably is, for example, within a range from about 50 µm to about 300 µm. In this preferred embodiment, the interval between the signal line 20 and the main ground conductor 22 preferably is about 150 µm, for example. The interval (distance in the z-direction) between the signal line 20 and the auxiliary ground conductor 24 is equal or substantially equal to the total of the thickness D2 of the dielectric sheet 18b and the thickness D3 of the adhesive layer 19, and preferably is, for example, within a range from about 10 µm to about 100 µm. In this preferred embodiment, the interval between the signal line 20 and the auxiliary ground conductor 24 preferably is about 50 µm, for example. Thus, the distance in the z-direction between the signal line 20 and the main ground conductor 22 is greater than the distance in the z-direction between the signal line 20 and the auxiliary ground conductor 24.

The via-hole conductors B1 are, as seen in FIG. 2, pierced in the dielectric sheet 18a in the z-direction. The via-hole conductors B1 are located farther in the positive y-direction than the signal line 20 and are aligned in the x-direction at uniform intervals. The via-hole conductors B2 are, as seen in FIG. 2, pierced in the adhesive layer 19 in the z-direction. The via-hole conductors B2 are located farther in the positive y-direction than the signal line 20 and are aligned in the x-direction at uniform intervals. The via-hole conductors B3 are, as seen in FIG. 2, pierced in the dielectric sheet 18b in the z-direction. The via-hole conductors B3 are located farther in the positive y-direction than the signal line 20 and are aligned in the x-direction at uniform intervals. The via-hole conductors B1 are connected to the respectively adjacent via-hole conductors B2, and the via-hole conductors B2 are connected to the respectively adjacent via-hole conductors B3. Accordingly, each connected set of via-hole conductors B1 through B3 defines and serves as one via-hole conductor. The respective positive ends in the z-direction of the via-hole conductors B1 are connected to the main ground conductor 22. The respective negative ends in the z-direction of the via-hole conductors B3 are connected to the auxiliary ground conductor 24, and more specifically to the respective positive sides in the y-direction of the bridges 60. The via-hole conductors B1 through B3 are formed by filling via holes made in the dielectric sheet 18a, the adhesive layer 19 and the dielectric sheet 18b with conductive paste including silver, tin, copper or the like and by solidifying the conductive paste.

The via-hole conductors B4 are, as seen in FIG. 2, pierced in the dielectric sheet 18a in the z-direction. The via-hole conductors B4 are located farther in the negative y-direction than the signal line 20 and are aligned in the x-direction at uniform intervals. The via-hole conductors B5 are, as seen in FIG. 2, pierced in the adhesive layer 19 in the z-direction. The via-hole conductors B5 are located farther in the negative y-direction than the signal line 20 and are aligned in the x-direction at uniform intervals. The via-hole conductors B6 are, as seen in FIG. 2, pierced in the dielectric sheet 18b in the z-direction. The via-hole conductors B6 are located farther in the negative y-direction than the signal line 20 and are aligned in the x-direction at uniform intervals. The via-hole conductors B4 are connected to the respectively adjacent via-hole conductors B5, and the via-hole conductors B5 are connected to the respectively adjacent via-hole conductors B6. Accordingly, each connected set of via-hole conductors B4 through B6 defines and serves as one via-hole conductor. The respective positive ends in the z-direction of the via-hole conductors B4 are connected to the main ground conductor 22. The respective negative ends in the z-direction of the via-hole conductors B6 are connected to the auxiliary ground conductor 24, and more specifically to the respective negative sides in the y-direction of the bridges 60. The via-hole conductors B4 through B6 are formed preferably by filling via holes made in the dielectric sheet 18a, the adhesive layer 19 and the dielectric sheet 18b with conductive paste consisting including silver, tin, copper or the like and by solidifying the conductive paste.

The via-hole conductor b1, as seen in FIG. 2, is pierced in the dielectric sheet 18a in the z-direction to connect the external terminal 16a and the negative end in the x-direction of the signal line 20 to each other. The via-hole conductor b2, as seen in FIG. 2, is pierced in the dielectric sheet 18a in the z-direction to connect the external terminal 16b and the positive end in the x-direction of the signal line 20 to each other. Thus, the signal line 20 is connected between the external terminals 16a and 16b. The via-hole conductors b1 and b2 are formed preferably by filling via holes made in the dielectric sheet 18a with conductive paste including silver, tin, copper or the like and by solidifying the conductive paste.

The protective layer 14 is an insulating layer that covers the substantially entire upper surface of the dielectric sheet 18a. Accordingly, the protective layer 14 covers the main ground conductor 22. The protective layer 14 is formed of, for example, flexible resin such as a resist material.

The protective layer 14, as illustrated in FIG. 2, includes a line portion 14a, and connecting portions 14b and 14c. The line portion 14a covers the substantially entire upper surface of the line portion 18a-a and accordingly covers the line portion 22a of the main ground conductor 22.

The connecting portion 14b is connected to the negative end in the x-direction of the line portion 14a and covers the upper surface of the connecting portion 18a-b. However, the connecting portion 14b includes openings Ha through Hd. The opening Ha is a rectangular or substantially rectangular opening made in the center of the connecting portion 14b. The external terminal 16a is exposed to outside through the opening Ha. The opening Hb is a rectangular or substantially rectangular opening located farther in the positive y-direction than the opening Ha. The opening Hc is a rectangular or substantially rectangular opening located farther in the negative x-direction than the opening Ha. The opening Hd is a rectangular or substantially rectangular opening located farther in the negative y-direction than the opening Ha. The terminal portion 22b is exposed to outside through the openings Hb through Hd and defines and functions as an external terminal.

The connecting portion 14c is connected to the positive end in the x-direction of the line portion 14a and covers the upper surface of the connecting portion 18a-c. However, the connecting portion 14c includes openings He through Hh. The opening He is a rectangular or substantially rectangular opening made in the center of the connecting portion 14c. The external terminal 16b is exposed to outside through the opening He. The opening Hf is a rectangular or substantially rectangular opening located farther in the positive y-direction than the opening He. The opening Hg is a rectangular or substantially rectangular opening located farther in the positive x-direction than the opening He. The opening Hh is a rectangular or substantially rectangular opening located farther in the negative y-direction than the opening He. The terminal portion 22c is exposed to outside through the openings Hf through Hh and defines and functions as an external terminal.

The protective layer 15 is an insulating layer that covers the substantially entire lower surface of the dielectric sheet 18b. Accordingly, the protective layer 15 covers the auxiliary ground conductor 24. The protective layer 15 is formed of, for example, flexible resin such as a resist material.

In the high-frequency signal line 10 having the structure above, the characteristic impedance of the signal line 20 changes cyclically between an impedance value Z1 and an impedance value Z2. More specifically, in areas A1 where the signal line 20 is located over the openings 30, relatively small capacitance is created between the signal line 20 and the auxiliary ground conductor 24. Accordingly, the characteristic impedance of the signal line 20 in the areas A1 is a relatively high value Z1.

In areas A2 where the signal line 20 is over the bridges 60, on the other hand, relatively large capacitance is created between the signal line 20 and the auxiliary ground conductor 24. Accordingly, the characteristic impedance of the signal line 20 in the areas A2 is a relatively low value Z2.

In this regard, the areas A1 and the areas A2 are arranged alternately in the x-direction, and therefore, the characteristic impedance of the signal line 20 changes cyclically between the value Z1 and the value Z2. The impedance value Z1 preferably is, for example, about 55Ω, and the impedance value Z2 preferably is, for example, about 45Ω. The average characteristic impedance of the signal line 20 as a whole preferably is, for example, about 50Ω.

Figure 6:
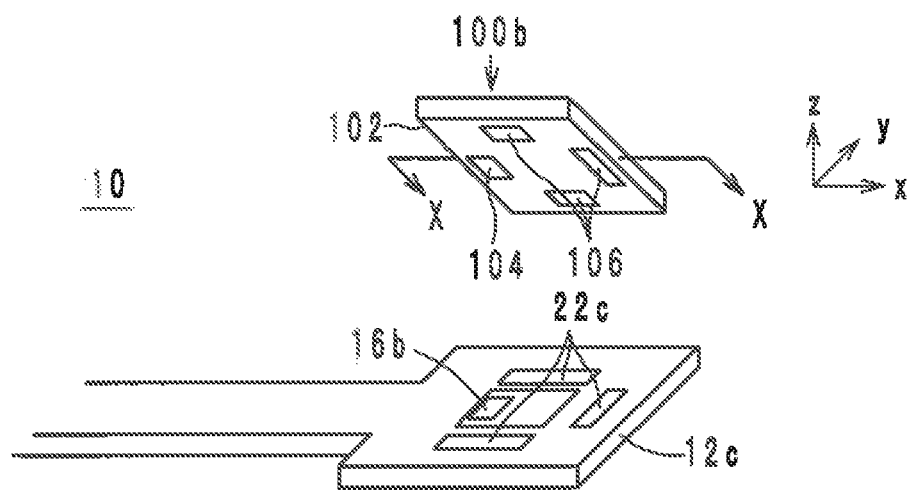
FIG. 6 is a perspective view of a connector of the high-frequency signal line.
Figure 7:
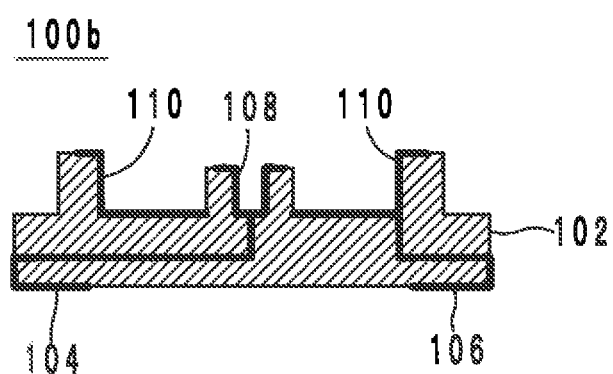
FIG. 7 is a sectional view of the connector of the high-frequency signal line.

The connectors 100a and 100b are, as illustrated in FIG. 1, mounted on the top surfaces of the connecting portions 12b and 12c, respectively. The connectors 100a and 100b have the same structure, and in the following, the structure of the connector 100b is described as an example. FIG. 6 is a perspective view of the connector 100b of the high-frequency signal line 10. FIG. 7 is a sectional view of the connector 100b of the high-frequency signal line 10.

The connector 100b, as illustrated in FIGS. 1, 6 and 7, includes a connector body 102, external terminals 104 and 106, a central conductor 108 and an external conductor 110. The connector body 102 preferably is in the shape of a rectangular or substantially rectangular plate with a cylinder connected thereon, and is formed of an insulating material such as resin.

The external terminal 104 is provided on the surface of the plate-shaped portion of the connector body 102 on the negative side in the z-direction so as to face the external terminal 16b. The external terminal 106 is provided on the surface of the plate-shaped portion of the connector body 102 on the negative side in the z-direction so as to face the terminal conductor 22c exposed through the openings Hf through Hh.

The central conductor 108 is located in the center of the cylindrical portion of the connector body 102 and is connected to the external terminal 104. The central conductor 108 is a signal terminal at which a high-frequency signal is input or output. The external conductor 110 is provided on the inner surface of the cylindrical portion of the connector body 102 and is connected to the external terminal 106. The external conductor 110 is aground terminal that is maintained at a ground potential.

The connector 100b having the structure above is, as illustrated in FIGS. 6 and 7, mounted on the top surface of the connecting portion 12c such that the external terminal 104 is connected to the external terminal 16b and such that the external terminal 106 is connected to the terminal conductor 22c. As a result, the signal line 20 is electrically connected to the central conductor 108, and the main ground conductor 22 and the auxiliary ground conductor 24 are electrically connected to the external conductor 110.

Figure 8:
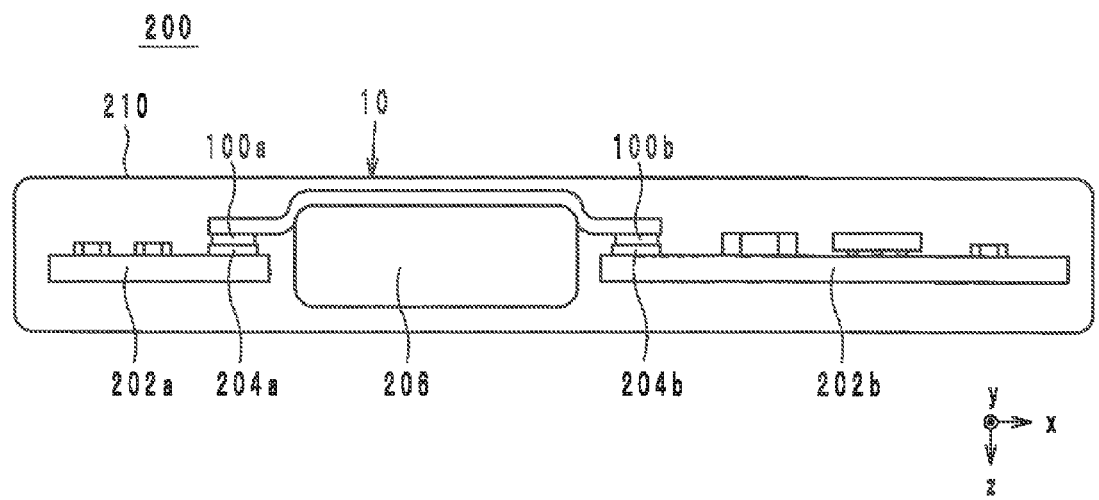
FIG. 8 is a plan view from a y-direction of an electronic device including the high-frequency signal line.
Figure 9:
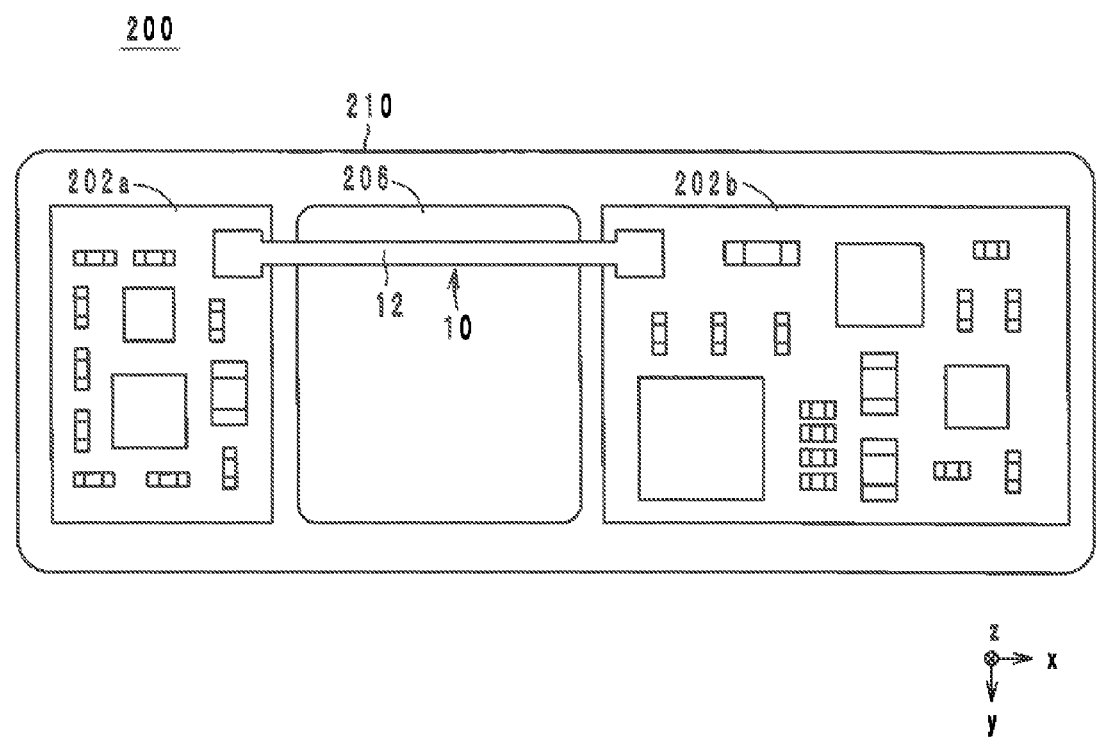
FIG. 9 is a plan view from a z-direction of the electronic device including the high-frequency signal line.

The high-frequency signal line 10 is preferably used in the following way. FIG. 8 is a plan view from the y-direction of an electronic device 200 including the high-frequency signal line 10. FIG. 9 is a plan view from the z-direction of the electronic device 200 employing the high-frequency signal line 10.

The electronic device 200 includes the high-frequency signal line 10, circuit boards 202a and 202b, receptacles 204a and 204b, a battery pack (metal object) 206, and a case 210.

In the circuit board 202a, for example, a transmitting circuit or a receiving circuit including an antenna is provided. In the circuit board 202b, for example, a feed circuit is provided. The battery pack 206 is, for example, a lithium-ion secondary battery, and the surface of the battery pack 206 is covered by a metal cover. The circuit board 202a, the battery pack 206 and the circuit board 202b are arranged in this order from the negative side to the positive side in the x-direction.

The receptacles 204a and 204b are provided on respective main surfaces of the circuit boards 202a and 202b on the negative side in the z-direction. The connectors 100a and 100b are connected to the receptacles 204a and 204b respectively. As a result, a high-frequency signal with a frequency of, for example, 2 GHz to be transmitted between the circuit boards 202a and 202b is applied to the central conductors 108 of the connectors 100a and 100b through the receptacles 204a and 204b. The respective external conductors 110 of the connectors 100a and 100b are maintained at the ground potential through the circuit boards 202a and 202b, and the receptacles 204a and 204b. In this way, the high-frequency signal line 10 connects the circuit boards 202a and 202b to each other.

In this state, the top surface of the dielectric laminate body 12 (specifically, the protective layer 14) is in contact with the battery 206, and the dielectric laminate body 12 is fixed to the battery pack 206 by an adhesive, for example.

With reference to the drawings, a non-limiting example of a method of producing the high-frequency signal line 10 is described below. In the following, a producing method of one high-frequency signal line 10 is described as a non-limiting example. Practically, however, by laminating large-size dielectric sheets and by cutting the laminate, a plurality of high-frequency signal lines are produced at one time.

First, dielectric sheets, each formed of thermoplastic resin and having a copper foil (metal film) entirely on one main surface, are prepared as the dielectric sheets 18a and 18b. Specifically, copper foils are applied to respective first main surfaces of the dielectric sheets 18a and 18b. The surfaces of the copper foils are, for example, galvanized for corrosion proof and thereby are smoothened. In this way, the dielectric sheets 18a and 18b, each having a copper foil on one main surface, are obtained. Each of the dielectric sheets 18a and 18b has a non-adhesion surface (shiny surface) having a low surface roughness and an adhesion surface (mat surface) having a great surface roughness. The dielectric sheets 18a and 18b are formed of liquid polymer. The thicknesses of the copper foils are preferably within a range from about 10 μm to about 20 μm, for example.

A sheet formed of thermoplastic resin and having a copper foil (metal film) entirely on one main surface is prepared as the adhesive layer 19. Specifically, a copper foil is applied to one main surface of the adhesive layer 19. The surface of the copper foil is, for example, galvanized for corrosion proof and thus is smoothened. The adhesive layer 19 is formed of liquid polymer. The thickness of the copper foil is preferably within a range from about 10 μm to about 20 μm, for example.

Next, the external terminals 16a and 16b, and the main ground conductor 22 as illustrated in FIG. 2 are formed on the upper surface of the dielectric sheet 18a by patterning the copper foil formed on the upper surface of the dielectric sheet 18a. Specifically, resists having identical shapes to the external terminals 16a and 16b, and the main ground conductor 22 are printed on the copper foil on the upper surface of the dielectric sheet 18a. Then, the copper foil is etched, so that the portions of the copper foil not covered by the resists are removed. Thereafter, a resist remover is sprayed so as to remove the resists. In this way, the external terminals 16a and 16b, and the main ground conductor 22 as illustrated in FIG. 2 are formed on the upper surface of the dielectric sheet 18a by photolithography.

Next, the signal line 20 as illustrated in FIG. 2 is formed on the upper surface of the adhesive layer 19. Further, the auxiliary ground conductor 24 as illustrated in FIG. 2 is formed on the lower surface of the dielectric sheet 18b. The process for forming the signal line 20 and the process for forming the auxiliary ground conductor 24 are the same as the process for forming the external terminals 16a and 16b, and the main ground conductor 22, and descriptions of the processes are omitted here.

Next, the dielectric sheets 18a and 18b, and the adhesive layer 19 are exposed to laser beams such that through holes are made in the dielectric sheets 18a and 18b, and the adhesive layer 19 at the positions of the via-hole conductors b1, b2 and B1 through B6. Thereafter, conductive paste is filled in the through holes, and thus, the via-hole conductors b1, b2 and B1 through B6 are formed.

Next, the dielectric sheet 18a, the adhesive layer 19 and the dielectric sheet 18b are laminated in this order from the positive side to the negative side in the z-direction, and the dielectric laminate body 12 is formed. In this regard, heat and pressure are applied to the laminate of the dielectric sheet 18a, the adhesive layer 19 and the dielectric sheet 18b from the positive and negative sides in the z-direction, and thus, the dielectric sheet 18a, the adhesive layer 19 and the dielectric sheet 18b are pressure-bonded together. The heating temperature preferably is, for example, equal to or higher than about 250 degrees C. and lower than about 280 degrees C. The heating at the temperature allows softening of only the adhesive layer 19 without causing softening of the dielectric sheets 18a and 18b. Thus, the dielectric sheets 18a and 18b are bonded via the adhesive layer 19.

Next, resin (resist) paste is applied to the upper surface of the dielectric sheet 18a as illustrated in FIG. 2 by screen printing. Thus, the protective layer 14 covering the upper surface of the main ground conductor 22 on the upper surface of the dielectric sheet 18a is formed.

Next, resin (resist) paste is applied to the lower surface of the dielectric sheet 18b as illustrated in FIG. 2 by screen printing. Thus, the protective layer 15 covering the lower surface of the auxiliary ground conductor 24 on the lower surface of the dielectric sheet 18c is formed.

Lastly, the connector 100a is mounted on the connecting portion 12b and soldered to the external terminal 16a and the terminal conductor 22b, and the connector 100b is mounted on the connecting portion 12c and soldered to the external terminal 16b and the terminal conductor 22c. Through the process above, the high-frequency signal line 10 as illustrated in FIG. 1 is obtained.

In the high-frequency signal line 10 having the structure above, variations in the interval between the signal line 20 and the main ground conductor 22 are reliably prevented. More specifically, in the high-frequency signal line 10, the softening point of the adhesive layer 19 is lower than the softening point of the dielectric sheets 18a and 18b. Therefore, the temperature at the process of pressure-bonding the dielectric sheet 18a, the adhesive layer 19 and the dielectric sheet 18b preferably is set to a temperature that is equal to or higher than the softening point of the adhesive layer 19 and lower than the softening point of the dielectric sheets 18a and 18b. Thus, during the process of pressure-bonding the dielectric sheet 18a, the adhesive layer 19 and the dielectric sheet 18b, the adhesive layer 19 is softened, and the dielectric sheets 18a and 18b are not softened. In the high-frequency signal line 10, the signal line 20 is fixed on the upper surface of the adhesive layer 19, and the main ground conductor 22 is provided on the upper surface of the dielectric sheet 18a. Accordingly, only the dielectric sheet 18a is present between the signal line 20 and the main ground conductor 22. Since the dielectric sheet 18a is not softened, there is almost no possibility that the interval between the signal line 20 and the main ground conductor 22 may vary due to softening of the dielectric sheet 18a. The area of the overlapping portion of the signal line 20 with the main ground conductor 22 is greater than the total area of the overlapping portions of the signal line 20 with the auxiliary ground conductor 24. Accordingly, the capacitance created between the signal line 20 and the main ground conductor 22 is greater than the capacitance between the signal line 20 and the auxiliary ground conductor 24. Therefore, the prevention of variations in the interval between the signal line 20 and the main ground conductor 22 results in prevention of variations in the characteristic impedance of the signal line 20.

In the high-frequency signal line 10, also, it is possible to make the dielectric laminate body 12 thinner, and it is easy to achieve desired electric characteristics. As described above, a possible measure to prevent variations in the interval between a ground conductor and a signal line is, for example, bonding dielectric sheets together via an adhesive layer. The use of the adhesive layer eliminates the necessity of softening the dielectric sheets during a pressure-bonding process. Accordingly, it is possible to lower the temperature at the time of pressure-bonding to a temperature not to cause softening of the dielectric sheets. Consequently, variations in the interval between the signal line and the ground conductor are reliably prevented.

In this case, however, it is necessary to use a dielectric sheet having a signal line provided thereon, and two more dielectric sheets, each having a ground conductor provided thereon, that is, it is necessary to use three dielectric sheets. Accordingly, the dielectric laminate body will be thicker. Further, in order to bond the three dielectric sheets together, two adhesive layers are necessary. The adhesive layers are greatly different from the dielectric sheets in properties such as dielectric constant, dielectric loss, water absorption coefficient, etc. Therefore, when the proportion of adhesive layers in the dielectric laminate body is great, it is difficult to achieve desired electric characteristics.

In the high-frequency signal line 10, however, the signal line 20 is provided on the adhesive layer 19. Accordingly, it is not necessary to prepare a dielectric sheet to support the signal line 20, and only two dielectric sheets 18a and 18b are necessary. Consequently, the dielectric laminate body 12 of the high-frequency signal line 10 is much thinner. In the high-frequency signal line 10, also, only one adhesive layer 19 is provided, and therefore, it is easy to achieve desired electric characteristics.

In the high-frequency signal line 10, also, it is not necessary to use any dielectric sheet having copper foils on both main surfaces. As described above, a possible measure to prevent variations in the interval between aground conductor and a signal line in a general high-frequency signal line is, for example, bonding dielectric sheets together via an adhesive layer. In this case, a dielectric sheet having a ground conductor provided on one main surface and a signal line provided on the other main surface, and another dielectric sheet having a ground conductor provided on one main surface may be bonded together via an adhesive layer. The use of the adhesive layer eliminates the necessity of softening the dielectric sheets during a pressure-bonding process. Accordingly, it is possible to lower the temperature at the time of pressure-bonding to a temperature not to cause softening of the dielectric sheets. Consequently, variations in the interval between the signal line and the ground conductor are reliably prevented.

In order to obtain the dielectric sheet having a signal line on one main surface and a ground conductor on the other main surface, it is necessary to use a dielectric sheet having copper foils on both main surfaces. A dielectric sheet having copper foils on both main surfaces is stiffer than a dielectric sheet having a copper foil on one main surface. Also, a patterning process carried out on a dielectric sheet having copper foils on both main surfaces to form a signal line and a ground conductor thereon is more complicated than a patterning process carried out on a dielectric sheet having a copper foil on one main surface.

In the high-frequency signal line 10, however, the signal line 20 is provided on the adhesive layer 19. The main ground conductor 22 is provided on the upper surface of the dielectric sheet 18a, and the auxiliary ground conductor 24 is provided on the lower surface of the dielectric sheet 18b. Thus, in the high-frequency signal line 10, it is not necessary to use any dielectric sheet 18 having copper foils on both main surfaces.

It is possible to make the high-frequency signal line 10 thinner. More specifically, when the high-frequency signal line 10 is viewed from the z-direction, in the areas A1, the signal line 20 is not over the auxiliary ground conductor 24. Accordingly, little capacitance is created between the signal line 20 and the auxiliary ground conductor 24. Therefore, even a reduction in the distance between the signal line 20 and the auxiliary ground conductor 24 will not cause a significant increase in the capacitance between the signal line 20 and the auxiliary ground conductor 24 and will not result in a significant shift of the characteristic impedance of the signal line 20 from a designed value (for example, about 50Ω). Thus, it is possible to make the high-frequency signal line 10 thinner while maintaining the characteristic impedance of the signal line 20 at a designed value.

Even when the high-frequency signal line 10 is fixed to a metal object such as the battery pack 206, a change in the characteristic impedance of the signal line 20 is prevented. More specifically, the high-frequency signal line 10 is fixed to the battery pack 206 such that the continuous main ground conductor 22 is located between the signal line 20 and the battery pack 206. Therefore, there is no risk that the signal line 20 and the battery pack 206 may face each other via openings, and capacitance is prevented from occurring between the signal line 20 and the battery pack 206. Accordingly, it is prevented that the characteristic impedance of the signal line 20 is reduced due to the fixation of the high-frequency signal line 10 to the battery pack 206.

Figure 10:
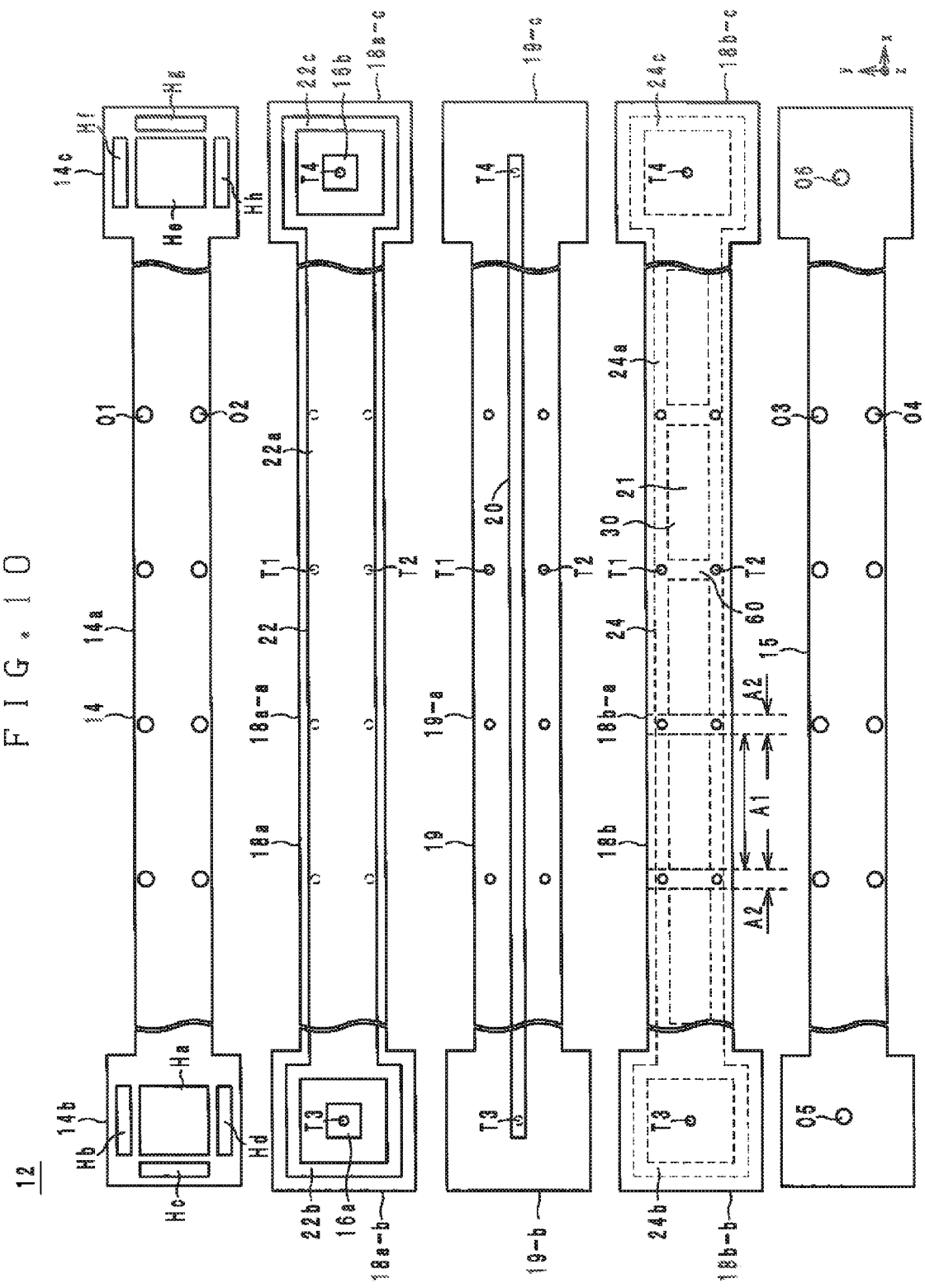
FIG. 10 is an exploded view of a laminate body of a high-frequency signal line according to a modification of a preferred embodiment of the present invention.
Figure 11:
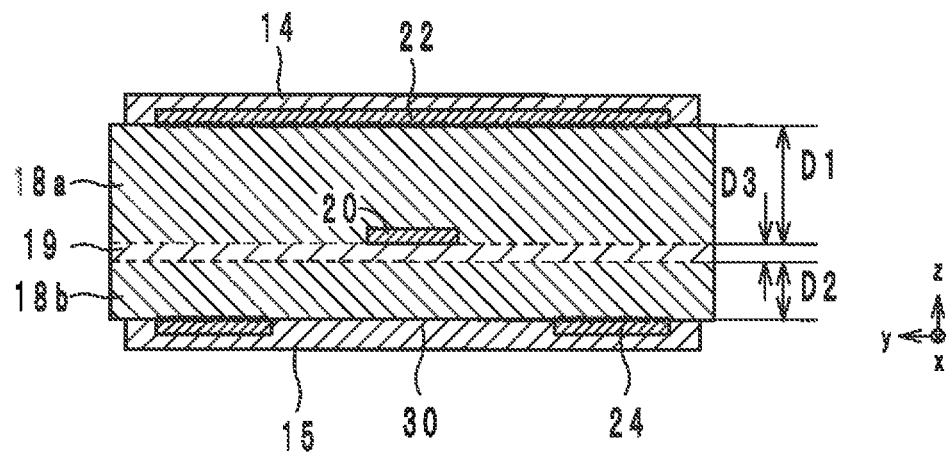
FIG. 11 is a sectional view of the high-frequency signal line cut at an opening portion.
Figure 12:
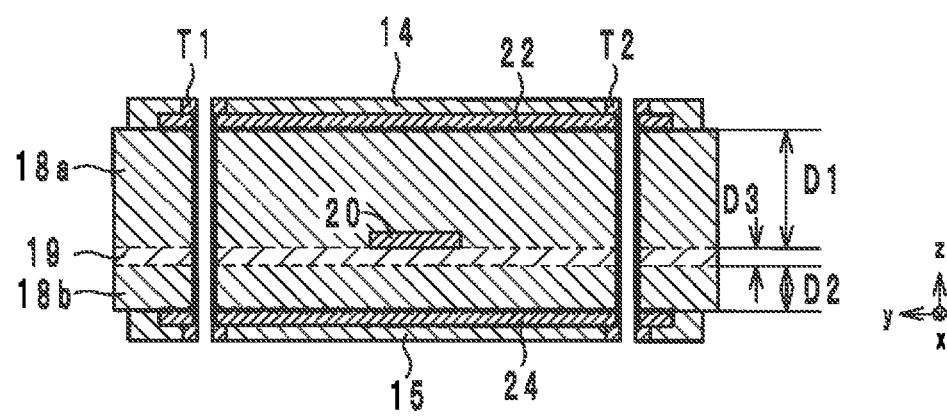
FIG. 12 is a sectional view of the high-frequency signal line cut at a bridge portion.

A high-frequency signal line 10a according to a modification of a preferred embodiment of the present invention is hereinafter described with reference to the drawings. FIG. 10 is an exploded view of the dielectric laminate body 12 of the high-frequency signal line 10a. FIG. 11 is a sectional view of the high-frequency signal line 10a cut at an opening 30. FIG. 12 is a sectional view of the high-frequency signal line 10a cut at a bridge 60. The appearance of the high-frequency signal line 10a is as illustrated in FIG. 1.

The high-frequency signal line 10a is different from the high-frequency signal line 10 in that the adhesive layer 19 is formed of a different material and in that through-hole conductors T1 through T4 are provided. More specifically, the adhesive layer 19 of the high-frequency signal line 10a is formed of epoxy-based thermosetting resin. The setting point of the adhesive layer 19 is lower than the softening point of the dielectric sheets 18a and 18b. Therefore, it is impossible to directly form the signal line 20 on the upper surface of the adhesive layer 19, and a strip-shaped rolled metal plate is used as the signal line 20. The signal line 20 is fixed on the upper surface of the adhesive layer 19. In this regard, the surfaces of the signal line 20 on the positive and negative sides in the z-direction are smooth since the signal line 20 is a strip-shaped rolled metal plate, and the signal line 20 is bonded on the adhesive layer 19 by the adhesive force of the adhesive layer 19 and is not fixed thereon by an anchor effect.

When the adhesive layer 19 is formed of thermosetting resin, it is impossible to pierce via-hole conductors in the adhesive layer 19. Therefore, in the high-frequency signal line 10, as seen in FIGS. 10 and 12, through-hole conductors T1 to T4 are provided instead.

The through-hole conductors T1 are, as seen in FIG. 10, pierced in the dielectric sheet 18a, the adhesive layer 19 and the dielectric sheet 18b in the z-direction. The via-hole conductors T1 are located farther in the positive y-direction than the signal line 20 and are aligned in the x-direction at uniform intervals. The positive ends in the z-direction of the through-hole conductors T1 are connected to the main ground conductor 22. The negative ends in the z-direction of the through-hole conductors T1 are connected to the auxiliary ground conductor 24. Thus, the through-hole conductors T1 connect the main ground conductor 22 and the auxiliary ground conductor 24 to each other. The through-hole conductors T1 are formed by piercing through holes in a laminate of the dielectric sheet 18a, the adhesive layer 19 and the dielectric sheet 18b and by forming a metal film, which, for example, includes nickel, gold or the like, on the inner surface of each of the through holes by plating.

The through-hole conductors T2 are, as seen in FIG. 10, pierced in the dielectric sheet 18a, the adhesive layer 19 and the dielectric sheet 18b in the z-direction. The via-hole conductors T2 are located farther in the negative y-direction than the signal line 20 and are aligned in the x-direction at uniform intervals. The positive ends in the z-direction of the through-hole conductors T2 are connected to the main ground conductor 22. The negative ends in the z-direction of the through-hole conductors T2 are connected to the auxiliary ground conductor 24. Thus, the through-hole conductors T2 connect the main ground conductor 22 and the auxiliary ground conductor 24 to each other. The through-hole conductors T2 are formed by piercing through holes in a laminate of the dielectric sheet 18a, the adhesive layer 19 and the dielectric sheet 18b and by forming a metal film, which, for example, includes nickel, gold or the like, on the inner surface of each of the through holes by plating.

The through-hole conductor T3 is, as seen in FIG. 10, pierced in the dielectric sheet 18a, the adhesive layer 19 and the dielectric sheet 18b in the z-direction to connect the external terminal 16a and the negative end in the x-direction of the signal line 20 to each other. The through-hole conductor T4 is, as seen in FIG. 3, pierced in the dielectric sheet 18a, the adhesive layer 19 and the dielectric sheet 18b in the z-direction to connect the external terminal 16b and the positive end in the x-direction of the signal line 20 to each other. Thus, the signal line 20 is connected between the external terminals 16a and 16b. The through-hole conductors T3 and T4 are formed by piercing through holes in a laminate of the dielectric sheet 18a, the adhesive layer 19 and the dielectric sheet 18b and by forming a metal film, which, for example, includes nickel, gold or the like, on the inner surface of each of the through holes by plating.

In the protective layer 14, openings O1 and O2 are provided at positions over the through-hole conductors T1 and the through-hole conductors T2, respectively. In the protective layer 15, openings O3 through O6 are provided at positions beneath the through-hole conductors T1 through T4, respectively.

In the high-frequency signal line 10a having the structure above, variations in the interval between the signal line 20 and the main ground conductor 22 are prevented. More specifically, in the high-frequency signal line 10a, the adhesive layer 19 is formed of thermosetting resin, and the setting point of the thermosetting resin is lower than the softening point of the dielectric sheets 18a and 18b. Therefore, the temperature at the process of pressure-bonding the dielectric sheet 18a, the adhesive layer 19 and the dielectric sheet 18b is set to a temperature that is equal to or higher than the setting point of the adhesive layer 19 and lower than the softening point of the dielectric sheets 18a and 18b. Thus, it is possible to harden the adhesive layer 19 by heat, consequently bonding the dielectric sheets 18a and 18b together, without softening the dielectric sheets 18a and 18b by heat during the process of pressure-bonding the dielectric sheet 18a, the adhesive layer 19 and the dielectric sheet 18b. In the high-frequency signal line 10a, the signal line 20 is fixed on the upper surface of the adhesive layer 19, and the main ground conductor 22 is provided on the upper surface of the dielectric sheet 18a. Accordingly, only the dielectric sheet 18a is present between the signal line 20 and the main ground conductor 22. Since the dielectric sheet 18a is not softened, there is almost no possibility that the interval between the signal line 20 and the main ground conductor 22 may vary due to softening of the dielectric sheet 18a. The area of the overlapping portion of the signal line 20 with the main ground conductor 22 is greater than the total area of the overlapping portions of the signal line 20 with the auxiliary ground conductor 24. Accordingly, the capacitance created between the signal line 20 and the main ground conductor 22 is greater than the capacitance between the signal line 20 and the auxiliary ground conductor 24. Therefore, the prevention of variations in the interval between the signal line 20 and the main ground conductor 22 results in prevention of variations in the characteristic impedance of the signal line 20.

In the high-frequency signal line 10a, also, the dielectric sheet 18b and the adhesive layer 19 located between the signal line 20 and the auxiliary ground conductor 24 are not softened by heat. Therefore, the interval between the signal line 20 and the auxiliary ground conductor 24 is also prevented from varying.

In the high-frequency signal line 10a, as in the high-frequency signal line 10, it is possible to make the dielectric laminate body 12 thinner, and it is easy to achieve desired electric characteristics.

In the high-frequency signal line 10a, as in the high-frequency signal line 10, it is not necessary to use any dielectric sheet 18 having copper foils on both main surfaces.

Also, as in the case of the high-frequency signal line 10, even when the high-frequency signal line 10a is fixed to a metal object such as the battery pack 206, a change in the characteristic impedance of the signal line 20 is prevented.

OTHER PREFERRED EMBODIMENTS

High-frequency signal lines according to the present invention are not limited to the high-frequency signal lines 10 and 10a above, and various changes are possible within the scope of the present invention.

It is possible to combine the structures of the high-frequency signal lines 10 and 10a.

In the high-frequency signal lines 10 and 10a described above, the protective layers 14 and 15 are formed preferably by screen printing, for example. However, the protective layers 14 and 15 may be formed by photolithography or other suitable process, for example.

The connectors 100a and 100b are not indispensable for the high-frequency signal lines 10 and 10a. In a case where the connectors 100a and 100b are not provided, the both ends of the high-frequency signal line 10 or 10a are connected to circuit boards by solder or the like. It is also possible that only the connector 100a is provided at only one end of the high-frequency signal line 10 or 10a.

In the high-frequency signal lines 10 and 10a, the connectors 100a and 100b are mounted on the top surface. However, the connectors 100a and 100b may be mounted on the bottom surface. Also, the connector 100a may be mounted on the top surface of the high-frequency signal line 10 or 10a, and the connector 100b may be mounted on the bottom surface of the high-frequency signal line 10 or 10a.

The openings 30 do not necessarily have to be provided in the auxiliary ground conductor 24.

The auxiliary ground conductor 24 may be provided on the upper surface of the dielectric sheet 18b.

Each of the high-frequency signal lines 10 and 10a may be used as a high-frequency signal line in an RF circuit board such as an antenna front-end module, for example.

As thus far described, preferred embodiments of the present invention are useful in a high-frequency signal line, and prevent variations in the interval between a signal line and a main ground conductor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A high-frequency signal line comprising:
a dielectric laminate body including a first dielectric layer, an adhesive layer and a second dielectric layer laminated in this order from a first side to a second side in a direction of lamination, the first dielectric layer including a first main surface and a second main surface, the first main surface being closer to the first side than the second main surface and the second main surface being closer to the second side than the first main surface, the adhesive layer including a third main surface and a fourth main surface, the third main surface being closer to the first side than the fourth main surface and the fourth main surface being closer to the second side than the third main surface;
a signal line fixed on the third main surface of the adhesive layer;
a main ground conductor provided on the first main surface of the first dielectric layer; and
an auxiliary ground conductor provided on the second dielectric layer; wherein:
the adhesive layer bonds the first dielectric layer and the second dielectric layer together; and
a distance in the direction of lamination between the signal line and the main ground conductor is greater than a distance in the direction of lamination between the signal line and the auxiliary ground conductor.

2. The high-frequency signal line according to claim 1, wherein the auxiliary ground conductor includes openings arranged along the signal line.

3. The high-frequency signal line according to claim 1, wherein an area of an overlapping portion of the signal line with the main ground conductor is greater than an area of an overlapping portion of the signal line and the auxiliary ground conductor.

4. The high-frequency signal line according to claim 1, wherein
the second dielectric layer includes a fifth main surface and a sixth main surface, the fifth main surface being closer to the first side than the sixth main surface and the sixth main surface being closer to the second side than the fifth main surface; and
the auxiliary ground conductor is provided on the sixth main surface of the second dielectric layer.

5. The high-frequency signal line according to claim 1, wherein the high-frequency signal line is flexible.

6. The high-frequency signal line according to claim 1, wherein
the first dielectric layer, the second dielectric layer and the adhesive layer include thermoplastic resin; and
a softening point of the adhesive layer is lower than a softening point of the first dielectric layer and lower than a softening point of the second dielectric layer.

7. The high-frequency signal line according to claim 1, wherein
the adhesive layer includes thermosetting resin; and
the signal line is fixed on the adhesive layer.

8. The high-frequency signal line according to claim 1, wherein the dielectric laminate body includes a first protective layer and a second protective layer provided at a top portion and a bottom portion respectively of the dielectric laminate body.

9. The high-frequency signal line according to claim 1, wherein the first dielectric layer and the second dielectric layer have different thicknesses.

10. The high-frequency signal line according to claim 1, wherein the signal line is a linear conductor.

11. The high-frequency signal line according to claim 1, wherein the main ground conductor does not have openings located over the signal line.

12. The high-frequency signal line according to claim 1, wherein the main ground conductor includes a line portion and terminal portions.

13. The high-frequency signal line according to claim 1, wherein the auxiliary ground conductor includes a line portion and terminal portions.

14. The high-frequency signal line according to claim 1, wherein the auxiliary ground conductor has a ladder configuration and the signal line extends across the ladder configuration.

15. The high-frequency signal line according to claim 1, wherein the signal line, the main ground conductor and the auxiliary ground conductor define a triplate structure.

16. The high-frequency signal line according to claim 1, wherein the distance between the signal line and the auxiliary ground conductor is equal or substantially equal to a total of a thickness of the first dielectric sheet and a thickness of the adhesive layer.

17. An electronic device comprising:
first and second high-frequency circuits;
the high-frequency signal line according to claim 1 arranged to connect first and second high-frequency circuits to each other.

18. The electronic device according to claim 17, wherein the electronic device is a cell phone.

19. The electronic device according to claim 17, wherein the first and second high-frequency circuits are transmitting circuits or receiving circuits and include an antenna.

20. The electronic device according to claim 17, further comprising a circuit board including the first and second high-frequency circuits provided therein.

* * * * *